July 24, 1923.
Z. T. UBIL
1,462,776
DEVICE FOR OPERATING AUTOMOBILE SIGNALS
Filed July 24, 1922    2 Sheets-Sheet 1
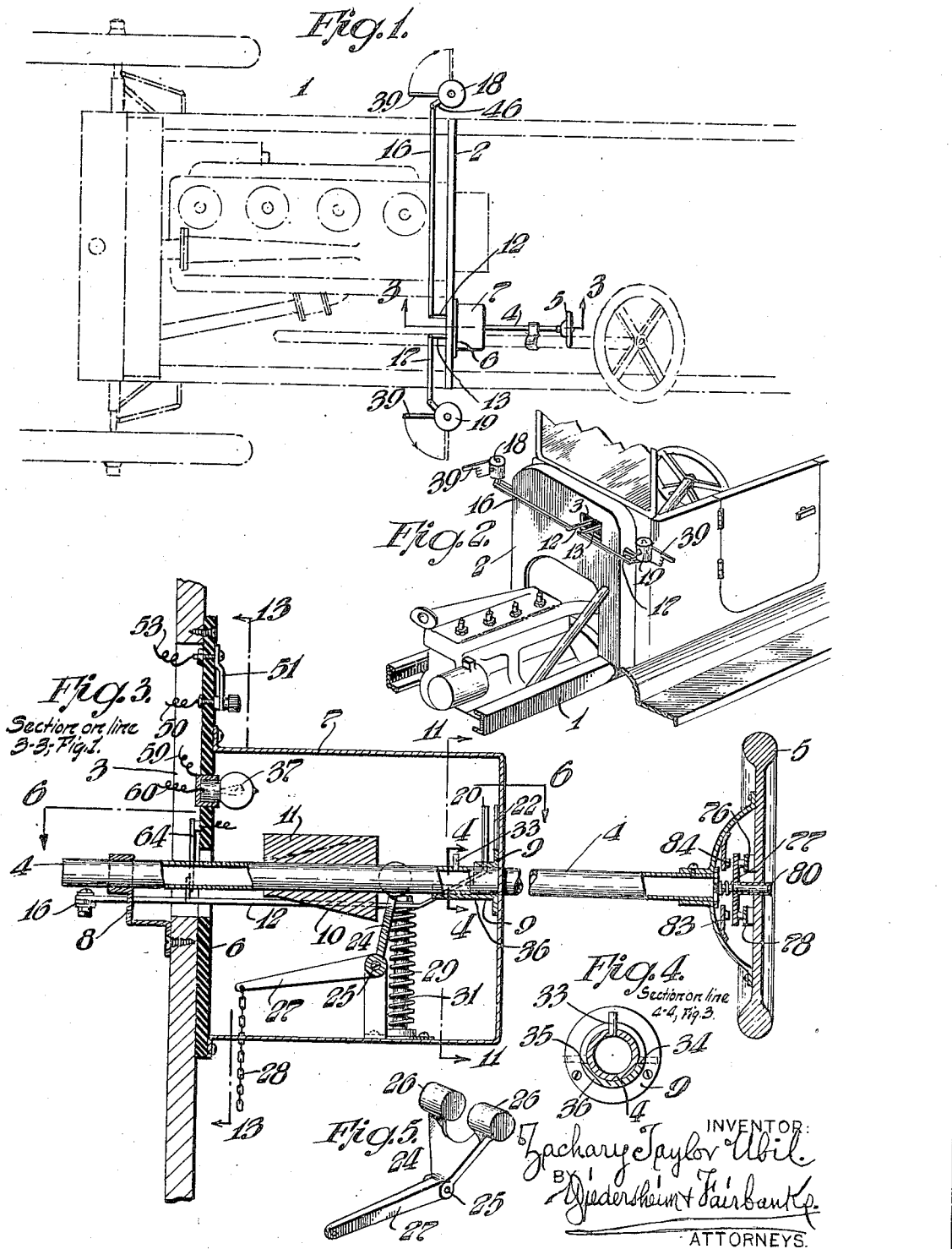

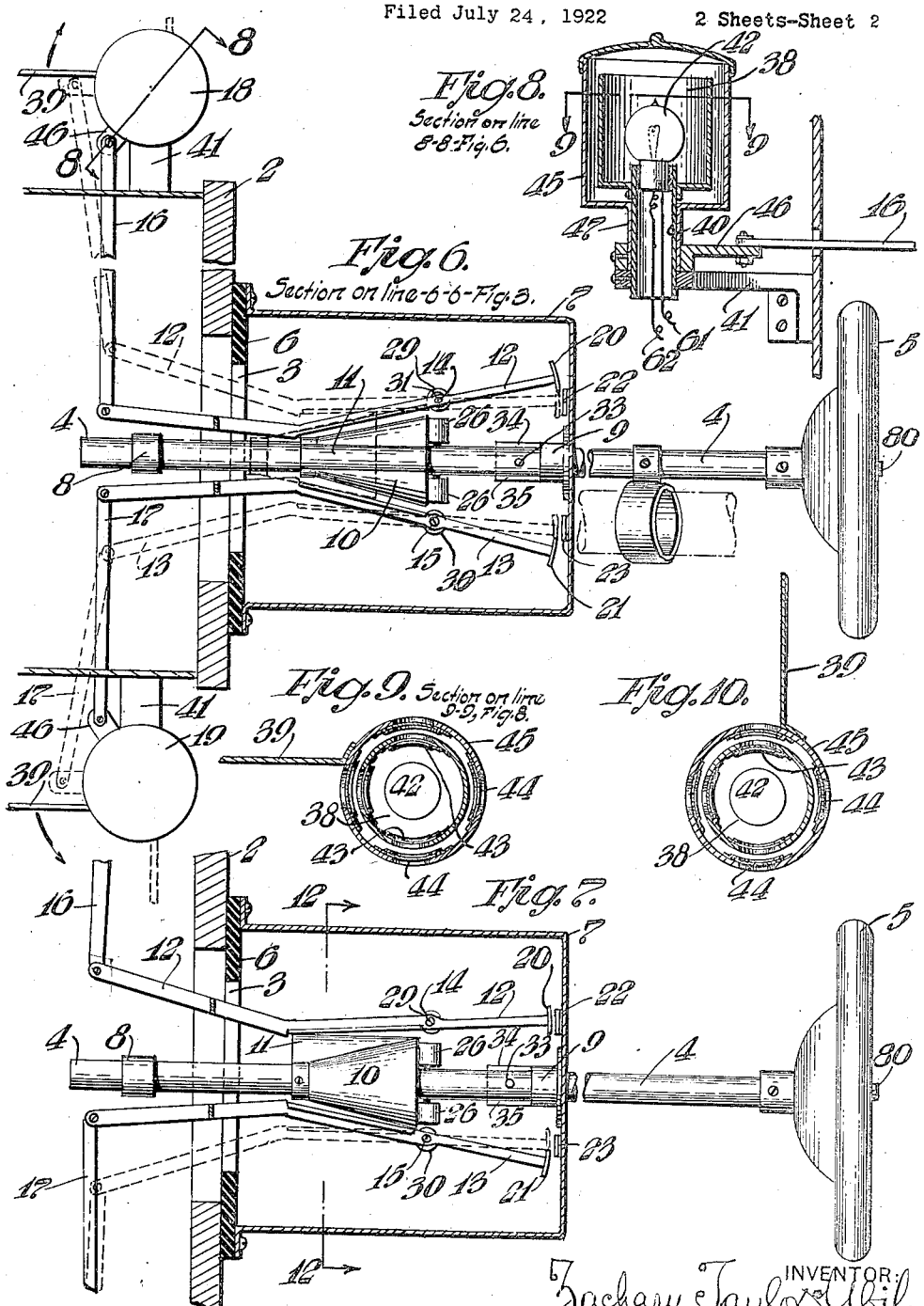

Patented July 24, 1923.

1,462,776

UNITED STATES PATENT OFFICE.

ZACHARY TAYLOR UBIL, OF PHILADELPHIA, PENNSYLVANIA.

DEVICE FOR OPERATING AUTOMOBILE SIGNALS.

Application filed July 24, 1922. Serial No. 576,943.

*To all whom it may concern:*

Be it known that I, ZACHARY TAYLOR UBIL, a citizen of the United States, residing in the city and county of Philadelphia, and State of Pennsylvania, have invented a new and useful Device for Operating Automobile Signals, of which the following is a specification.

My invention relates to the general class of signals for moving vehicles, and its principal object is to provide means broadly as such by which the driver of an automobile, or other form of self-propelled vehicle, can operate signals so mounted with reference to his seat as to be visible in advance or from the front, and also from the sides and rear of the vehicle.

A further object is the provision of special means to enable the operator to control the signals independently or consonantly of each other, so that either one of them or both may be made visible from the front, from the sides and from the rear, and in a sense automatically perform their functions.

With the foregoing and other objects in view, my invention comprehends the devices which are illustrated in the accompanying drawings and hereinafter described, the particular subject matter which I claim as novel being, however, hereinafter definitely specified in the claiming clauses.

The invention is satisfactorily illustrated in the accompanying drawing, but the important instrumentalities thereof may be varied, and so it is to be understood that the invention is not limited to the specific details shown and described, as long as they are within the spirit or scope of the invention.

In the drawings,

Figure 1 represents a plan view partly in outline of my signalling devices in normal position.

Figure 2 represents a perspective of the front part of an automobile to which my invention is applied.

Figure 3 represents a longitudinal, vertical, section through the casing and its adjuncts, taken on the line 3—3 of Figure 1.

Figure 4 represents a transverse section through the control shaft, taken on the line 4—4 of Figure 3.

Figure 5 represents a view in perspective of a rocking lever that I employ to control by a foot pedal the longitudinal movement of the control wheel and shaft.

Figure 6 represents a longitudinal sectional plan on the line 6—6 of Figure 3 through the casing, illustrating in a given position the control wheel, control shaft and its cone, the signal-operating levers and the connecting rods to the signals.

Figure 7 represents a view similar to Figure 6 with the parts in a different position.

Figure 8 represents a central, vertical, sectional elevation through a signal of a form that I find it convenient to employ.

Figure 9 represents a transverse, sectional plan of said signal, on the line 9—9 of Figure 8.

Figure 10 represents a view similar to Figure 9 with the parts in a different position.

Similar numerals of reference indicate corresponding parts.

Referring to the drawings, 1 designates in general outline the front portion of an automobile illustrated as embodying my improvements.

2 designates a dash board of any usual and preferred construction and formed with a vertical opening 3, preferably circular, through which passes the hollow shaft 4 of the control wheel 5, as illustrated particularly in Figures 3, 6 and 7.

6 designates an insulating plate which serves as a carrier for the various electrical and wiring connections of which I make use in my lighting system and which is conveniently mounted upon the rear face of the dash board 2.

Extending rearwardly from the dash board 2 and the insulating plate 6, is a casing 7, through which the control shaft 4 passes and within which are mounted and protected from exposure the principal operative elements of my device.

Referring now more particularly to Figure 3, the control shaft 4 is shown as passing entirely through and beyond the inner end of the casing, being externally of the front of the casing supported upon a bracketed bearing 8, and at the rear of the casing supported by being passed through another bearing mounted within the casing and designated 9.

Within the casing and rigidly secured to the control shaft 4 is a cone, or coniform member, 10, the apex of which extends forwardly and the base of which faces the rear wall of the casing.

Extending lengthwise of the cone, and integral with or attached to it, is a radial lug 11, best seen in Figures 3, 7 and 12, the function of which in the oscillatory movement of the control shaft and cone, is to encounter and deflect with relation to their fulcra 14 and 15, signal operating levers 12 and 13.

Primarily these levers 12 and 13 which extend beyond the dash board, through connecting rods 16 and 17, operate the signalling lanterns of other signalling devices 18 and 19, a preferred electrically lighted type of which is especially illustrated in Figures 8, 9 and 10.

The rear ends of the operating levers 12 and 13 are formed or provided with occluding plates 20 and 21, which, according to the position of the levers, open or close the dead lights 22 and 23 in the rear wall of the casing. When the lug of the cone occupies the vertical position, as in Figure 3, both dead lights are opened, but of course, as later explained, either may be opened and the other closed.

The control shaft 4 of the control wheel 5 being mounted for end-for-end movement through its bearings 8 and 9, and the cone 10 being a fixture upon it, the driver can force the cone forward by pressure against the control wheel which is on the shaft, and effect its withdrawal by pulling back the control wheel and shaft.

When, however, it is desired to move the cone and shaft without the driver's directly forcing forward and drawing back the control wheel, I provide a rocking lever 24, see Figure 5, fulcrumed at 25 and formed with separated heads 26 which encompass the control shaft and bear against the base of the cone 10, and also formed with an arm 27, the outer end of which is connected through a chain or rod 28 with a foot lever suitably mounted in the machine and which it is unnecessary to illustrate.

Referring to Figure 3,—29 and 30 designate vertically disposed return springs mounted upon the standards 31 and 32, the function of which is to return the signal-operating levers 12 and 13 to normal position after deflection through the operation of the cone lug 11.

The extent of rotary movement of the control shaft 4 is determined by a radial stop 33 on the shaft, see Figures 3 and 4, which is adapted to encounter, according to the direction of the rotation of the shaft, the upper edges 34 and 35 of a sleeve-like extension 36, of the rear bearing 9.

37 designates a light in the casing, controlled by electrical connections hereinafter described.

Referring now to the signals themselves, it will be understood that any type may be employed and that they are preferably placed at the forward end of the vehicle in advance of the dash board.

Signals of a character which I find it convenient to use are illustrated in Figures 6, 8, 9 and 10, and they are essentially corresponding rotary lights of a type, for instance, of the flash lights in light houses, and are each composed, in the constructions illustrated, of a fixed internal light chamber 38 mounted upon a tubular support 40 which is itself supported upon a portion of the frame 41 of the machine.

An incandescent bulb or other light 42 as best illustrated in Figure 8, is mounted in the top of the support 40.

Extending through the walls of the fixed light chamber 38 are a plurality of light openings 43, Figures 9 and 10, through which the light from the bulb passes and is thrown outwardly through light openings 44 in a revolving cage or case 45, which is cylindrical to encompass the light chamber 38 and adapted to be moved with relation to its supporting axis 47 upon the support 40, by the operation of the connecting rods 16 or 17 upon crank arms 46 extending from and connected with said tubular axis 47 of each cage 45.

The light openings 43 and 44 may, of course, serve as frames within which lenses of colored glass are mounted, and I do not wish to confine myself to any special color of lens or any particular relation of one color to another.

The usual colors are white, green and red, to indicate safety, caution and danger,—and, according to the control of the rotary movement of the cage or casing 45 and the light openings 44 in it, with regard to the light openings 43 in the internal light chamber 38, the desired color will, by registry, be exposed or shut off in any direction desired.

In this regard it is of the essence of the invention that the signals should be capable of independent movement, although of course they can be conjunctly moved.

It is also within the scope of my invention to attach to the machine signals which embody, as indicated in Figure 2, indicating hands or pointers 39 which bear no direct relation to the lighting signals, but are simply solid signals of direction to be used under the judgment of the operator.

It will now be apparent that I have devised a novel and useful device for operating automobile signals which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a device of the character described, in combination,—a control wheel,—a control shaft,—a conical member on the shaft,—connective means operated by the conical member,—and signalling devices operated by said connective means.

2. In a device of the character described, in combination,—a control wheel,—a control shaft,—a conical member embodying a radial lug and fixedly mounted on the shaft,—connective means operated by the lug of the conical member,—and signalling devices operated by said connective means.

3. In a device of the character described, in combination,—a control wheel,—a control shaft,—a conical member mounted on the shaft with its apex facing forward,—connective means operated by the conical member,—and signalling devices operated by said connective means.

4. In a device of the character described, in combination,—a control wheel,—a control shaft,—a conical member embodying a radial lug and fixedly mounted on the shaft with its apex facing forward,—connective means operated by the lug of the conical member,—and signalling devices operated by said connective means.

5. In a device of the character described, in combination,—a control wheel,—a control shaft,—a conical member on the shaft,—a plurality of signal-operating levers operated by the conical member,—a plurality of connecting rods connected with the signal-operating levers,—and signalling devices operated by said connecting rods.

6. In a device of the character described, in combination,—a control wheel,—a control shaft,—a conical member embodying a radial lug and fixedly mounted on the shaft,—a plurality of signal-operated levers operated by the lug of the conical member,—a plurality of connecting rods connected with the signal-operating levers,—and signalling devices operated by said connecting rods.

7. In a device of the character described, signalling devices, and means comprising a tapering member and coacting lever mechanism for operating said signalling devices independently of each other in the same or in different directions of light-transmission.

8. In a device of the character described, signalling devices, and means comprising a control wheel, control shaft, a conical member on said shaft, and connections operated by the conical member, for operating said signalling devices independently of each other in the same or in different directions of light-transmission.

9. In a device of the character described, in combination, a control wheel adapted to be both oscillated and advanced or retracted under the control of the operator,—a control shaft connected with said control wheel and so mounted as to be capable of both oscillatory and end-for-end movement within fixed bearings,—a conical member fixed upon said shaft and formed with a longitudinally-extending, radially projecting lug,—signalling devices adapted for independent or consonant movement,—signal-operating levers fixedly fulcrumed with relation to the shaft and lug,—and connecting rods between the levers and the signalling devices,—whereby upon the movement of the control shaft and conical member, the signalling devices are operated through the intervention of the levers and connecting rods.

10. In a device of the character described, signalling devices, and means comprising a manually operated tapering member and coacting lever mechanism for operating them independently of each other in the same or in different directions.

11. In a device of the character described, in combination,—a control wheel,—a control shaft,—a conical member on the shaft,—connective means operated by the conical member,—a casing,—and signalling devices operated by said connective means.

ZACHARY TAYLOR UBIL.

Witnesses:—
 JOHN A. WIEDERSHEIM,
 N. BUSSINGER.